United States Patent [19]

Retallick

[11] 4,425,305
[45] Jan. 10, 1984

[54] CATALYTIC CREOSOTE BURNER FOR A WOOD STOVE

[76] Inventor: William B. Retallick, 1432 Johnny's Way, West Chester, Pa. 19380

[21] Appl. No.: 405,294

[22] Filed: Aug. 4, 1982

Related U.S. Application Data

[63] Continuation-in-part of Ser. No. 269,367, Jun. 1, 1981, abandoned, which is a continuation-in-part of Ser. No. 232,973, Feb. 9, 1981, abandoned.

[51] Int. Cl.³ .................. B01D 53/36; B01J 15/00; F23B 5/00; F23J 15/00
[52] U.S. Cl. ............................ 422/180; 110/203; 110/211; 126/77; 422/187
[58] Field of Search ............ 422/171, 173, 176, 179, 422/180, 187, 220-222, 177; 60/299; 110/203, 211, 214; 126/58, 77, 280; 252/477 R

[56] References Cited

U.S. PATENT DOCUMENTS

| | | | |
|---|---|---|---|
| 1,979,187 | 10/1934 | Bindley | 252/477 R |
| 2,993,454 | 7/1961 | Hebert | 110/211 |
| 3,056,467 | 10/1962 | Ravich | 422/176 |
| 3,819,334 | 6/1974 | Yoshida et al. | 422/180 |
| 3,908,367 | 9/1975 | Bauman | 60/299 |
| 4,154,568 | 5/1979 | Kendall et al. | 422/180 |
| 4,280,926 | 7/1981 | Abe et al. | 252/477 R |
| 4,307,068 | 12/1981 | Matsumoto et al. | 422/180 |
| 4,319,556 | 3/1982 | Schwartz et al. | 110/203 |
| 4,330,503 | 5/1982 | Allaire et al. | 110/203 |
| 4,345,528 | 8/1982 | Allaire et al. | 110/203 |
| 4,363,785 | 12/1982 | Willson | 422/180 |
| 4,373,507 | 2/1983 | Schwartz et al. | 110/203 |

Primary Examiner—Bradley Garris
Attorney, Agent, or Firm—William H. Eilberg

[57] ABSTRACT

The catalytic creosote burner comprises a nest of metal plates spaced so that flue gas can flow between the plates. The plates are coated with a catalyst for burning creosote. The plates converge in the direction of the gas flow. There is an advantage in this configuration of converging plates. The frontal area of the burner that faces the fire is increased, so that the burner receives additional heat by radiation from the fire. The frontal area that faces the flue is reduced so that less heat is lost by radiation from the burner. As a result, the burn up of creosote is higher than when the plates are parallel, at the original inlet spacing.

4 Claims, 9 Drawing Figures

CATALYTIC CREOSOTE BURNER FOR A WOOD STOVE

CROSS REFERENCE TO OTHER APPLICATION

This is a continuation-in-part of U.S. patent application Ser. No. 269,367, filed June 1, 1981, now abandoned, which is a continuation-in-part of U.S. patent application Ser. No. 232,973, filed Feb. 9, 1981 now abandoned.

BACKGROUND OF THE INVENTION

Wood stoves are being used increasingly for space heating. Creosote formed from incomplete combustion of the wood causes chimney fires and also air pollution. When the chimney is cool, creosote condenses in the chimney. Later, when the chimney becomes hot, the deposit of creosote can ignite and cause a chimney fire.

Catalytic burners are being installed in wood stoves to burn the creosote before it enters the chimney. Catalytic burners known in the art comprise a ceramic honeycomb coated with catalyst. These honeycombs are similar to those used in catalytic mufflers in automobiles, except that they have larger channels. The term "honeycomb" is used to indicate a structure having channels with not only hexagonal cross sections, but also square or rectangular cross sections, or indeed any arrangement wherein the catalyst support is not a continuous slot from side to side. If the mouth of a rectangular channel becomes plugged, the whole channel is blocked out. If any section of the face of the honeycomb becomes blinded with unburned paper or metal foil, that much of the honeycomb is blocked out. When this blockage occurs, carbon monoxide tends to become trapped in the stove, causing a potentially dangerous condition. It would be advantageous to display the catalytic surface in continuous slots instead of in rectangular channels. If the mouth of a slot becomes partly obstructed, flue gas can flow around the obstruction and enter the slot.

The chemical reaction whereby creosote vapor, which is not yet condensed to make smoke, is catalyzed and burned starts at about 500° F. Below this temperature, the catalytic combustion is quenched and creosote vapor passes through burner into the chimney. When the fire is burning low, it is often difficult to keep the catalyst hot enough to sustain the catalytic combustion. One object of this invention is to provide a creosote burner that remains hot and active when the fire is low.

SUMMARY OF THE INVENTION

The present invention comprises, in one embodiment, a plurality of tubes through which water or air passes. The tubes are coated with catalyst on their exterior surfaces, and are placed in the path of the flue gas from the stove. The tubes are arranged such that many parallel paths for the gas are provided, so that partial blockage of part of one path will not seriously impede the flow of gas out of the stove.

In another embodiment, the invention comprises a set of tubes, carrying water or air inside them, and having disposed around their outsides a plurality of fins. The fins, which are coated with catalyst, isolate the metal tubes from the burning creosote, such that the catalytic surface is generally not cooled sufficiently to quench the catalytic reaction.

In another embodiment, the invention comprises a nest of spaced-apart metal plates, the plates being coated with catalyst. The nest is positioned so that flue gas can flow between the plates.

In another embodiment the plates converge in the direction of the gas flow.

In still another embodiment, a single strip of metal, coated with catalyst, is wound into a spiral, with adjacent layers of the spiral being spaced apart so that flue gas can flow through the spiral. In this embodiment, the opening in the stove, through which the flue gas flows, is circular, to accommodate the spiral.

Accordingly, it is an object of the invention to provide a catalytic creosote burner for a wood stove.

It is another object of the invention to provide a catalytic burner that is made of metal so that it can be secured in place by bolting or welding.

It is another object to provide a catalytic burner that is less likely to become blinded by paper or metal foil than is a ceramic honeycomb.

It is aother object of the invention to provide a creosote burner that remains hot and active when the fire is burning low.

It is another object of the invention to provide a catalytic burner wherein the catalyst is displayed on a heat transfer surface so that the heat of burning is recovered in heated air or water.

It is another object of the invention to isolate, at least partially, the heat transfer surface from the catalytic reaction site, so that the temperature needed to sustain the catalytic reaction is maintained.

It is another object of the invention to provide a catalytic burner for a wood stove, wherein the burner can be formed from a single strip of metal.

Other objects and advantages of the present invention will be apparent to those skilled in the art from a reading of the following brief description of the drawings, the detailed description of the invention, and the appended claims.

DETAILED DESCRIPTION OF THE INVENTION

Figure 2:
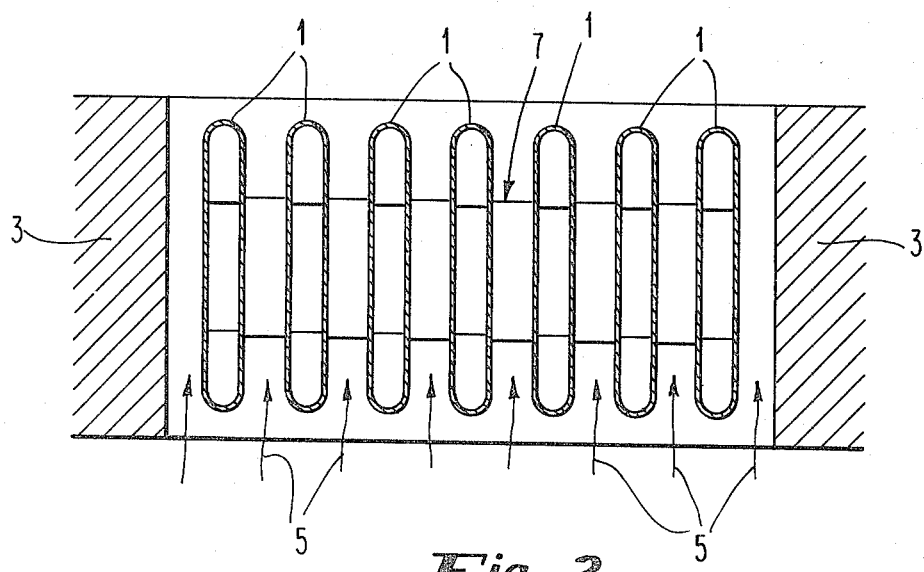
FIG. 2 is a top view of the catalytic burner shown in FIG. 1.

FIG. 2 shows a cross section through the catalytic burner, the catalytic burner comprising a stack of tubes 1. The tubes 1 are mounted across the face of an opening, defined by walls 3 of the stove. Gas from the wood stove passes through the opening, and between the tubes, in the direction of arrows 5. The tubes 1 are hollow, so that air or water can flow through them. The outside of the tubes 1 is coated with catalyst.

Figure 1:
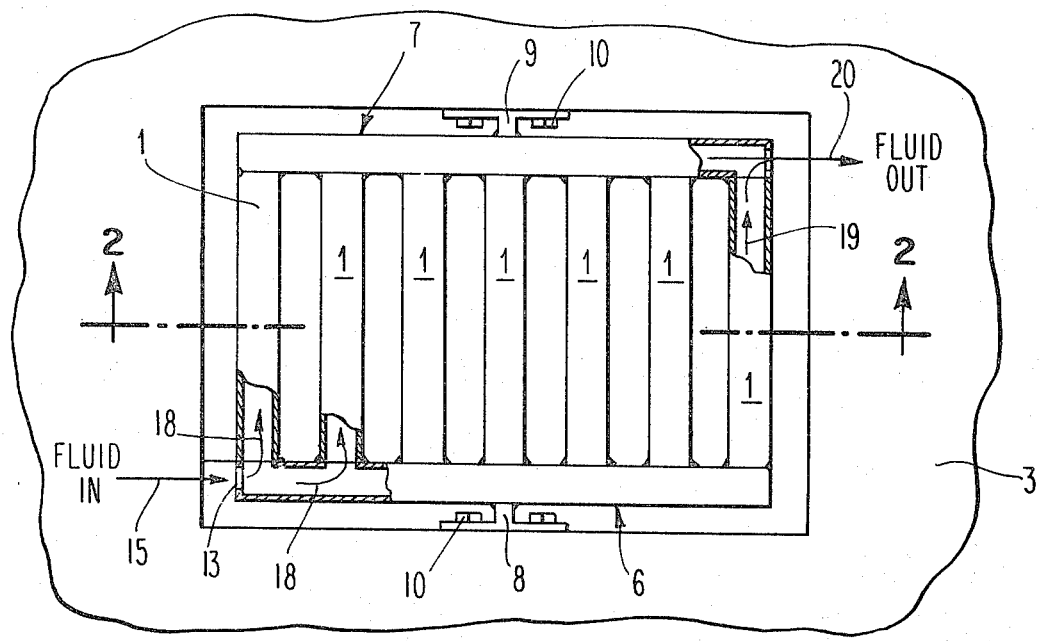
FIG. 1 shows a cross sectional view through a catalytic burner comprised of a stack of tubes, the tubes having a quasi-rectangular cross section.

The structure of the catalytic creosote burner is further illustrated in the top view given in FIG. 1. It is seen that the tubes 1 are connected to a pair of manifolds 6 and 7, which are mounted to the stove by brackets 8 and 9, respectively, with bolts 10. Manifold 6 comprises a channel adapted to receive fluid (either air or water) through opening 13, the fluid coming from a source (not shown) and traveling in the direction of arrow 15. Manifold 6 then distributes the fluid among the tubes 1, as indicated by arrows 18 in the cut-away portion of the figure. Fluid passing through the tubes 1 is then collected by manifold 7 and leaves the burner, as indicated by arrows 19 and 20. The fluid then can be circulated through the house, to provide additional heat in rooms, or to provide hot water. The fluid could circulate through either a closed or an open system. In the case of a closed system, the water or air would be returned to the inlet to manifold 6, through opening 12, for reheating.

The precise shape of the tubes 1 is not critical. The cross section of the tubes can be quasi-rectangular, as is indicated in FIG. 2, but can also have other shapes. What is important is that the tubes 1 be stacked to provide substantially parallel slots through which flue gas can flow.

Figure 3:
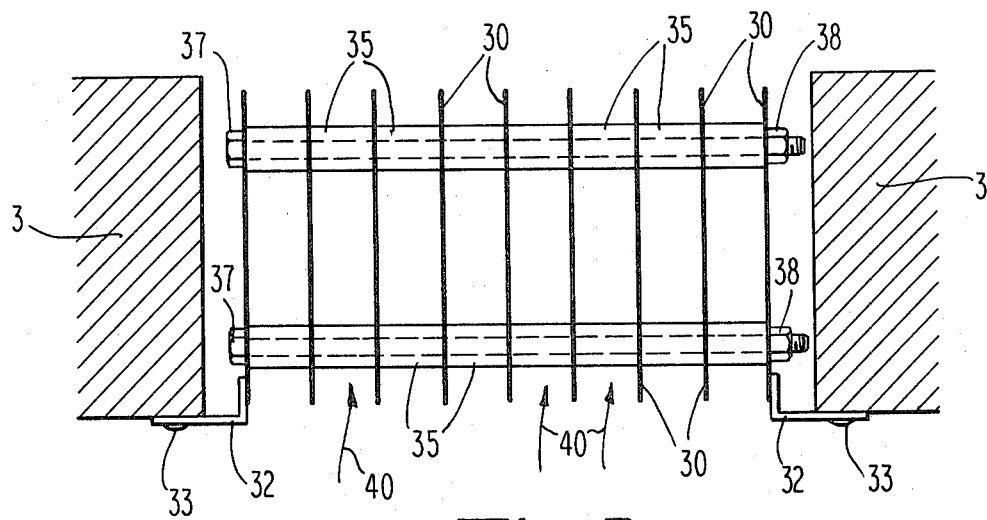
FIG. 3 is a top view of an alternative embodiment, showing a nest of metal plates.

An alternative embodiment of the invention is shown in FIG. 3. In FIG. 3, the rectangular tubes of FIG. 1 are replaced with a stack of metal plates 30. The plates are mounted to the walls 3 of the wood stove by brackets 32 and bolts 33. Bushings 35 provide separation between adjacent plates, and the stack is held together by long bolts 37 and nuts 38. The plates are coated with catalyst, and the flue gas flows through the slots between the plates, in the direction indicated by arrows 40. However, in the embodiment of FIG. 3, there is no provision for heating air or water, as in the first embodiment, since there are no interior channels through which such fluid could pass. But both of the embodiments of FIG. 1 and FIG. 3 have the advantage that the slots are unlikely to become blinded by stray paper or metal foil, in contrast to the conventional ceramic honeycomb. In order to block an entire slot in either of these embodiments, the stray paper or foil would need to extend the entire width of the slot, which is an unlikely occurrence.

Figure 4:
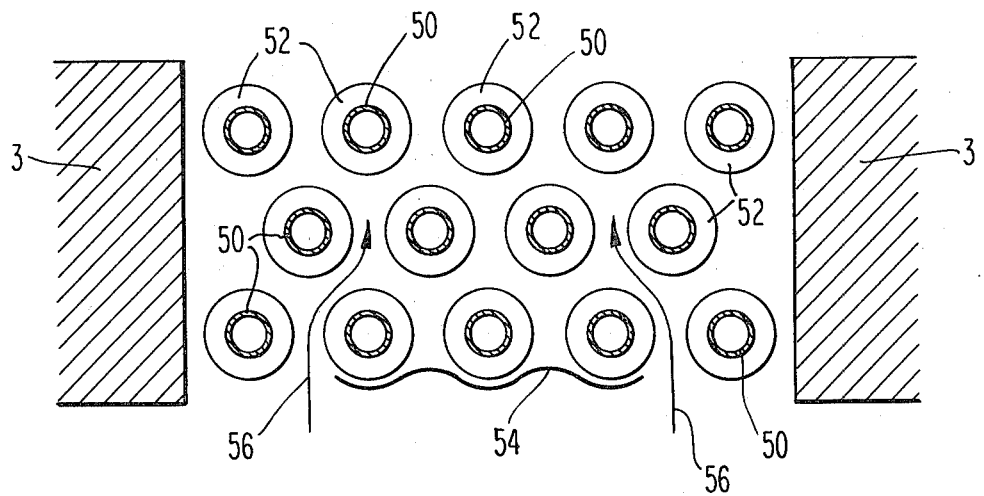
FIG. 4 is a cross sectional view through a catalytic burner having round tubes equipped with fins.

Another embodiment of the present invention is shown in FIG. 4. In this embodiment, there is shown a nest of round tubes 50 having fins 52 on the outside surface of the tubes. The fins 52 are coated with catalyst. Although the fins 52 are shown as circular, they could be of any shape. In FIG. 4, the inlet to the nest of tubes 50 is shown partly obstructed by a sheet 54 of unburned paper or metal foil. The arrows 56 indicate that flue gas is flowing around the sheet 54. The gas is thus able to reach the regions which would have been blocked by a conventional honeycomb having rectangular channels. In the embodiment of FIG. 4, as in the embodiment of FIG. 1, air or water is caused to flow through the interior of tubes 50 by conventional means such as a blower or a pump (not shown).

One disadvantage of the embodiment of FIG. 1 is that in the latter embodiment, the catalytic surface is separated from the water or air that is being heated inside only by the thickness of the metal. Thus, the catalytic surface might become sufficiently cooled to quench the burning of the creosote.

The embodiment shown in FIG. 4 avoids the above-described problem. In the design of FIG. 4, heat from burning the creosote is conducted through the fins 52 to the interior of tubes 50. The temperature at any point on the fin 52 depends on several variables. The temperature of the fin increases with an increase in the rate of burning per unit area of fin, and also increases with the radial distance from the tube. The temperature at any point on the fin decreases with an increase in the thickness of the fin, and with an increase of the thermal conductivity of the fin metal.

Thus, the temperature of the fin increases radially outward along the fin, from the tube to the outer radius of the fin. Thus the outer regions of the fin tend to have a temperature sufficiently high to catalyze the burning of creosote, whereas the inner region of the fin, i.e. a ring near the tube, usually has a temperature too low to catalyze the reaction. Regions having temperatures both sufficient and insufficient to catalyze the reaction may co-exist on the fin. Thus, the inner radial portions of the fin tend not to participate in the catalytic reaction, whereas the outer portions of the fin tend to become preferred sites for the catalysis.

The condition of a fin having these different rings of activity is most likely to exist when the catalyst is a platinum group metal. This is so because the rate of burning over platinum metals does not increase continuously with the temperature, but instead there is a well-defined ignition temperature where the extent of oxidation rises precipitously from essentially zero to essentially 100%. Therefore, if the outer radius of the fin is too small, or if the fin is too thick, the cold inner ring will extend over the entire radius of the fin, and there will be no catalytic burning at all. In designing the fins, one must aim for a balance between the value of the outer radius, the thickness of the fin, and the thermal conductivity of the fin metal, so that there always will be an outer ring wherein the temperature of the fin is high enough to catalyze burning.

Figure 5:
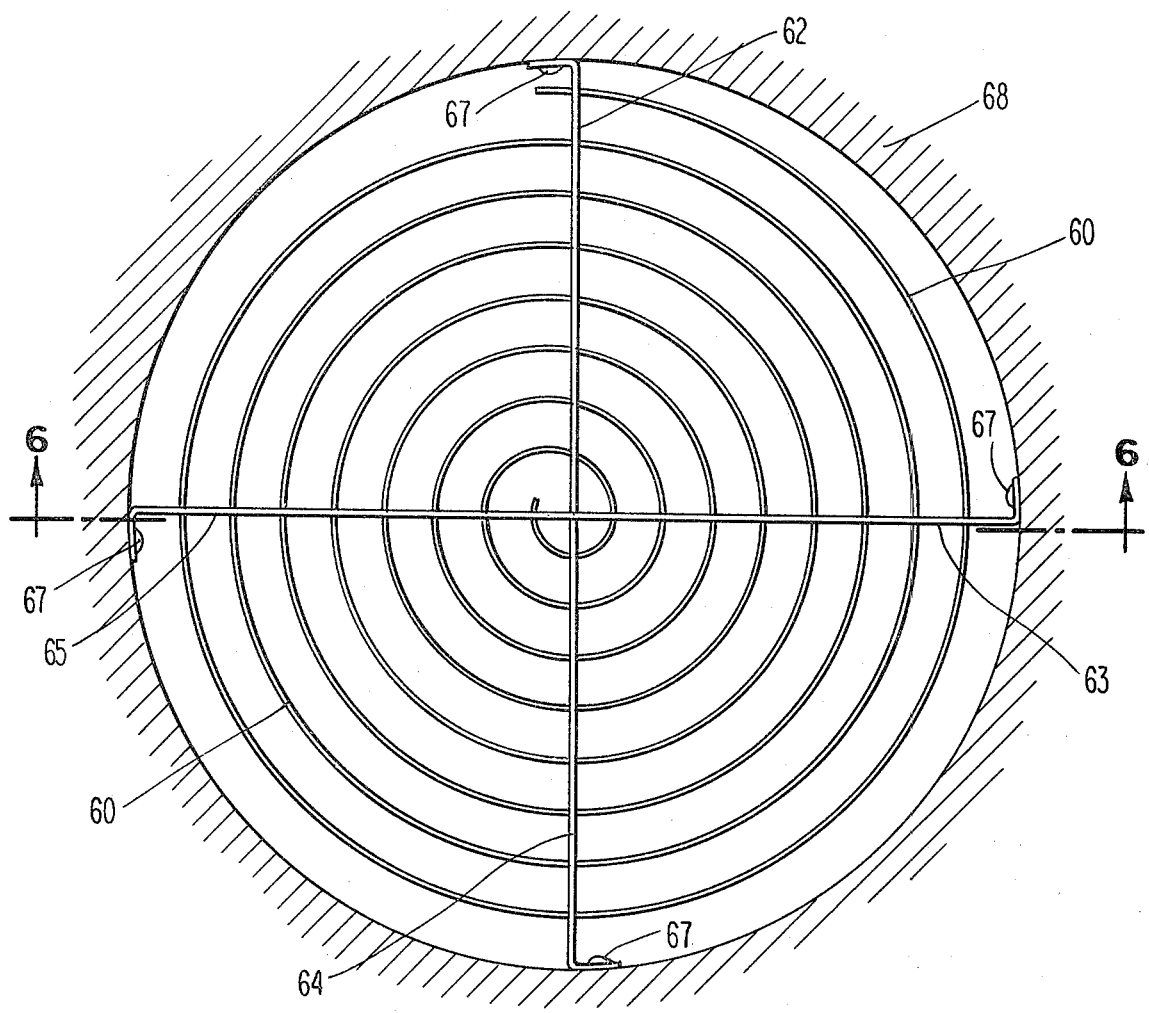
FIG. 5 is a top view of a catalytic burner formed from a single strip of metal wound into a spiral.
Figure 6:
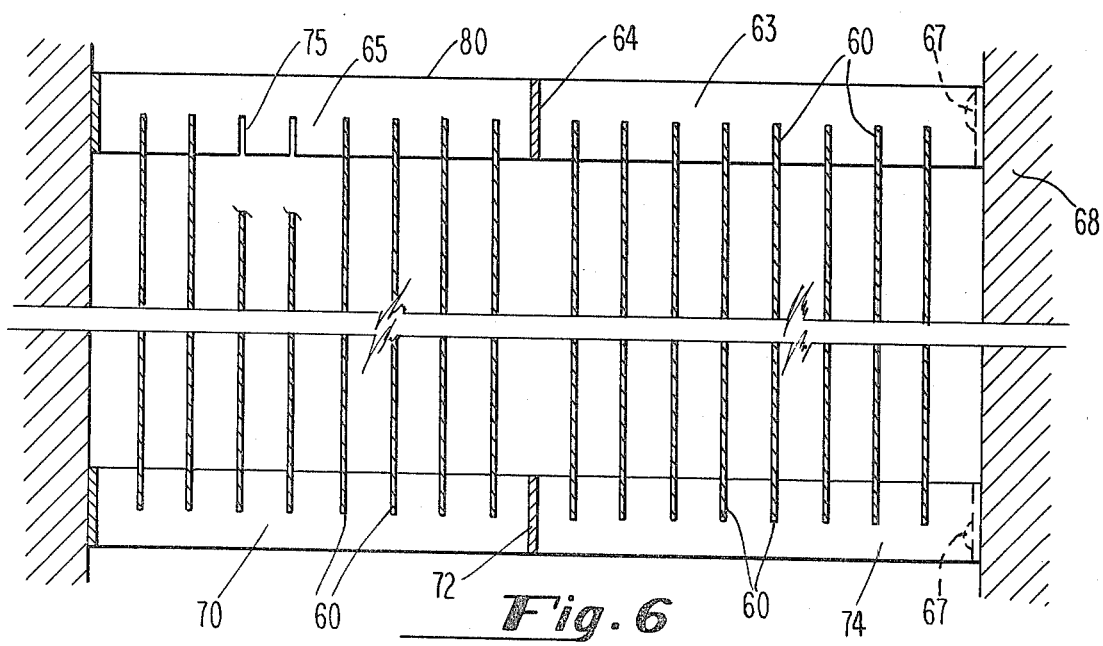
FIG. 6 is a cross sectional view, taken along the line 6—6 of FIG. 5.

An alternative embodiment of the present invention is shown in FIGS. 5 and 6. FIG. 5 is a top view of a catalytic creosote burner for a wood stove, the figure also showing a portion of the stove in cross section. In FIG. 5, there is shown a single strip of metal 60, which is wound into a spiral and held in place by cross braces 62, 63, 64, and 65. The cross braces are bolted into the wall 68 of the wood stove by bolts 67. The wall 65 defines a circular shaped outlet path for flue gas. Other shapes are possible, but a circular shape is preferred because of the ease of forming a spiral to fit this shape. The strip is coated with a catalyst for burning creosote.

The attachment of the cross braces to the metal strip is better illustrated in the cross sectional view of FIG. 6. The cross braces are seen to have slits such as that designated by reference numeral 75 in cross brace 65, the slits being adapted to receive the metal strip 60. Thus, successive layers of the metal strip 60 are held apart a sufficient distance to provide a path for gas flow. In practice, the distance between adjacent layers of the strip 60 would be about 0.2–0.3 inches. This spacing allows stray foil and flying pieces of paper to pass through the creosote burner without difficulty.

A set of cross braces may also be used at the other face of the creosote burner. (As used herein, "face" refers to the surface defined by the edges of the strip after the strip has been wound into a spiral. In the embodiment shown, there are thus two faces of the spiral.) Such a set is shown in FIG. 6, which illustrates cross braces 70, 72, and 74 at the bottom of the burner. In the embodiment shown, there are thus four cross braces in each face of the spiral. Other numbers of cross braces could be used, if desired.

The advantage of the embodiment shown in FIGS. 5 and 6 is that a stack of separate plates or tubes has been replaced by a single long strip wound into a spiral. The advantage of the spiral is that it is cheaper to manufacture. Like the other embodiments, the spiral provides a multiplicity of paths through which flue gas can flow. If a piece of paper or foil clogs a portion of the face of the spiral, the entire burner will not be clogged, because there are ample alternative paths along which gas may flow to circumvent the obstruction.

FIG. 6 shows that the edge 80 of cross brace 65, like the edges of the other cross braces, is raised relative to the face of the spiral. This feature is due to the fact that slits 75 extend only about half way into the cross braces. This feature further prevents blockage by stray paper or metal foil, because the cross braces protrude beyond the face of the spiral.

Figure 7:
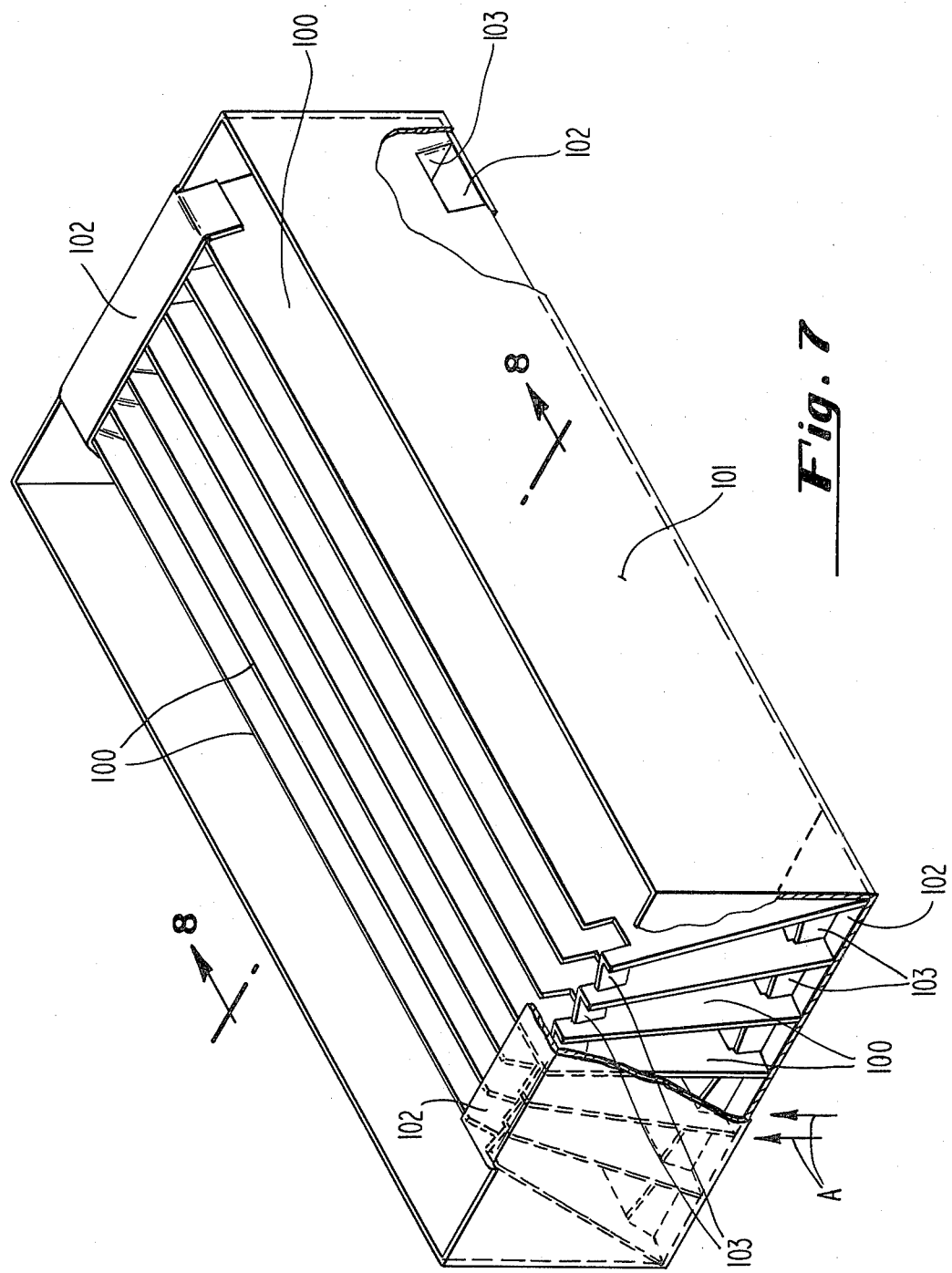
FIG. 7 is a perspective view of a nest of metal plates that converge in the direction of gas flow.

FIG. 7 is a partially cut-away perspective view of a nest of plates that converge in the direction of gas flow. Plates 100 are mounted on box frame 101. Plates 100 are held in the box frame 101 by shelves 102 that are integral with frame 101. The spacing between plates 100 is maintained by tabs 103 formed from the metal of the plates. The direction of gas flow is indicated by arrows A.

Figure 8:
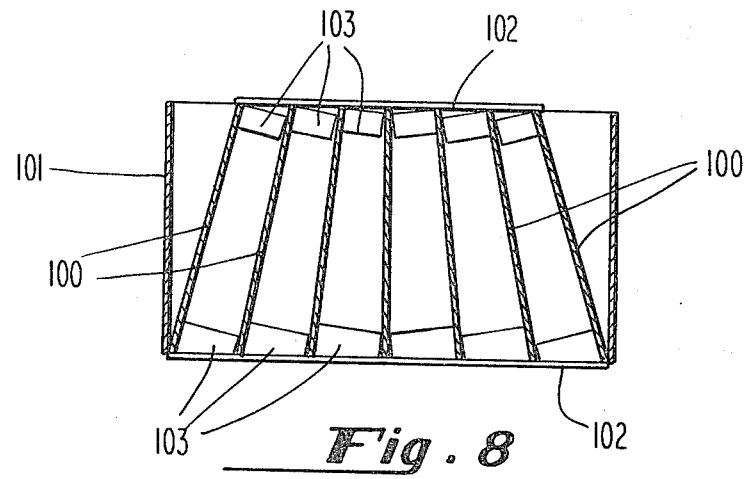
FIG. 8 is a cross sectional view, taken along the line 8—8 of FIG. 7.

It is seen from FIGS. 7 and 8 that the plates are continuously converging. That is, the distance between the plates becomes continuously smaller in the direction of gas flow.

FIG. 8 is a cross-sectional view, showing the configuration of the converging plates 100. This view clearly shows the tabs 103 which hold the plates 100 in spaced relation, both at the top and the bottom of box frame 101.

Figure 9:
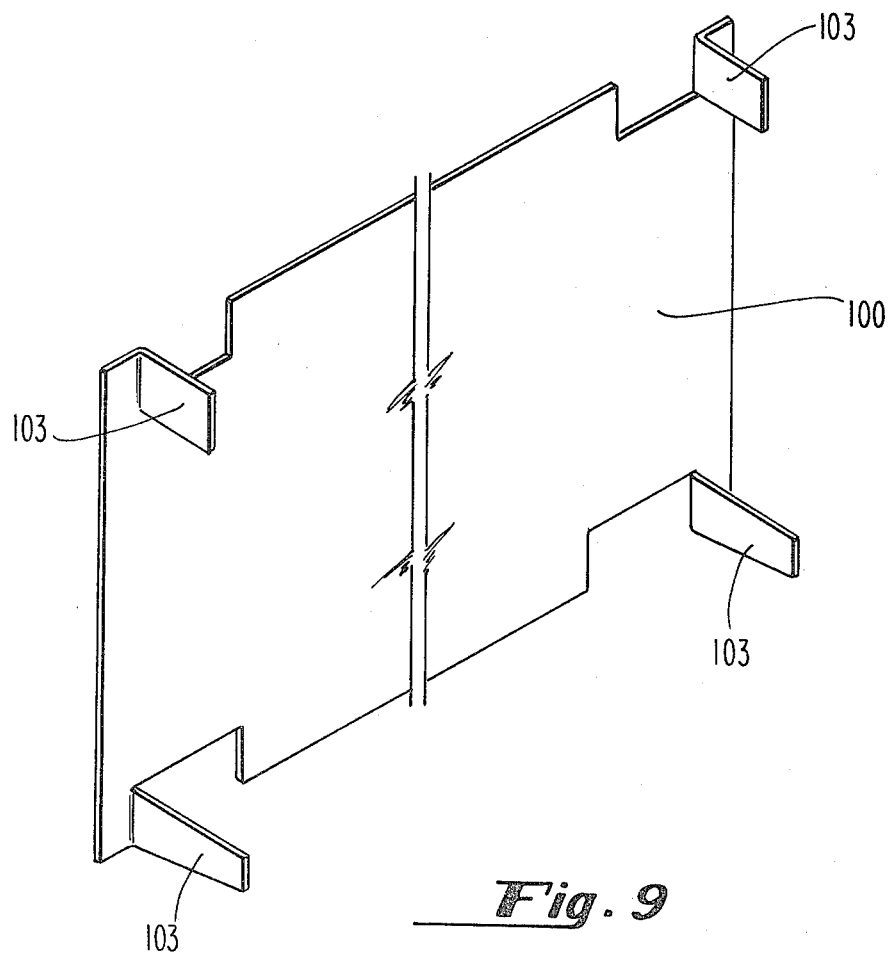
FIG. 9 is a partial perspective view of one of the plates, showing tabs disposed thereon.

FIG. 9 is a partial perspective view showing one of the plates 100, with the tabs 103, integrally formed with the plates.

Another way to maintain the spacing between adjacent plates 100 is to put flanges on the edges of shelves 102. The flanges would have slits, like slits 75 in FIG. 6, to engage plates 100 and to maintain the spacing.

The following is an example of a catalytic creosote burner, made according to the present invention. It is understood that the invention is not limited by the specific details in this example.

A creosote burner was made up from 24 plates of metal 5.6 inches long and 3 inches wide. The spacing was 5 plates per inch. The burner was mounted in a wood stove. A low fire was maintained at a heat rate of about 10,000 BTUs per hour. A constant fraction of the flue gas emerging from the burner was passed through a trap that condensed the creosote. The trap was weighed after a measured time interval to determine the rate at which unburned creosote was passing through the burner. When the plates were parallel, at a spacing of 5 plates per inch, unburned creosote passed through at a rate of 700 weight units per hour. When the spacing was reduced to 8 plates per inch at the outlet, with 5 plates per inch at the inlet, unburned creosote passed through at a rate of about 200 units per hour. Thus, making the plates converge reduced the emission of unburned creosote by about 70%.

Possible reasons for the improvement are that the converging plates receive more heat by radiation from the fire, and lose less heat by radiation to the flue, than the parallel plates. Also, the converging plates may increase the rate of transport of creosote vapor to the catalyzed surface. It is understood, however, that the invention is not limited by this particular explanation. Other factors, which are presently unknown, may be responsible for some or all of the benefits of the invention.

My co-pending patent application, Ser. No. 379,741, filed May 19, 1982, discloses a catalytic flame holder having converging cones coated with catalyst. The velocity of the gases through the flame holder is hundreds of feet per second, and complete combustion was to be avoided, rather than desired. In the present creosote burner, the velocity of the flue gas is only a few feet per second, and complete combustion is the only purpose.

It is understood that many modifications of the invention are possible, and that such modifications are intended to be within the spirit and scope of the following claims.

What is claimed is:

1. In a combination, a wood stove and a catalytic creosote burner, the stove having a combustion area and an outlet path for flue gas flowing from the combustion area, the catalytic burner comprising a nest of spaced-apart, substantially flat metal plates, the plates being coated with a combustion catalyst for burning creosote, the nest being positioned along the outlet path of the stove, the nest defining a plurality of channels through which gas can flow, the nest having an inlet end and an outlet end, the inlet end being positioned nearer to the combustion area of the stove than the outlet end, such that flue gas can flow into the inlet end and through the channels to the outlet end, each of said plates extending from said inlet end to said outlet end and wherein the distance between adjacent plates of the nest at the inlet end is greater than the distance between adjacent plates at the outlet end so that the distance between adjacent plates becomes continuously smaller in the direction of gas flow.

2. The combination of claim 1, wherein the plates are disposed within a box frame, and wherein the plates are held within the box frame by shelves which are integral with the box frame.

3. The combination of claim 2, wherein there is at least one tab on each plate, the tabs being positioned to hold the plates in spaced relation.

4. The combination of claim 3, wherein the spacing of the plates at the inlet end is in the range of 4–6 plates per inch, and the spacing of the plates at the outlet end is in the range of 6–8 plates per inch.

* * * * *